United States Patent
Yamaoka et al.

(10) Patent No.: US 8,622,188 B2
(45) Date of Patent: Jan. 7, 2014

(54) ROLLER FOR IN-FURNACE CONVEYANCE

(75) Inventors: Hiroto Yamaoka, Tokyo (JP); Yoichi Yamashita, Tokyo (JP); Natsuki Yoneyama, Tokyo (JP); Masahiro Kuchi, Tokyo (JP); Hisashi Honjou, Yokohama (JP)

(73) Assignee: IHI Corporation (JP)

( * ) Notice: Subject to any disclaimer, the term of this patent is extended or adjusted under 35 U.S.C. 154(b) by 0 days.

(21) Appl. No.: 13/580,805

(22) PCT Filed: Feb. 18, 2011

(86) PCT No.: PCT/JP2011/053519
§ 371 (c)(1),
(2), (4) Date: Aug. 23, 2012

(87) PCT Pub. No.: WO2011/105298
PCT Pub. Date: Sep. 1, 2011

(65) Prior Publication Data
US 2012/0318634 A1 Dec. 20, 2012

(30) Foreign Application Priority Data
Feb. 26, 2010 (JP) ................. 2010-042432

(51) Int. Cl.
*C21D 1/00* (2006.01)
*F27B 9/24* (2006.01)
*B65G 13/00* (2006.01)

(52) U.S. Cl.
CPC ... *C21D 1/00* (2013.01); *F27B 9/24* (2013.01); *B65G 13/00* (2013.01)
USPC ........ 193/37; 432/246; 29/895.21; 29/895.22

(58) Field of Classification Search
USPC ....... 193/37, 35 R, 35 J; 432/246; 29/895.21, 29/295.22
See application file for complete search history.

(56) References Cited

U.S. PATENT DOCUMENTS

| 1,092,464 A | * | 4/1914 | Watson et al. ............... 384/565 |
| 2,024,024 A | | 12/1935 | Carpenter ................... 263/6 |

(Continued)

FOREIGN PATENT DOCUMENTS

| CN | 201285220 Y | 8/2009 |
| CN | 201476579 U | 5/2010 |

(Continued)

OTHER PUBLICATIONS

Chinese Office Action, dated Apr. 1, 2013, issued in corresponding Chinese Application No. 201180010760.5 English translation included. Total 9 pages.

(Continued)

*Primary Examiner* — Mark A Deuble
(74) *Attorney, Agent, or Firm* — Ostrolenk Faber LLP

(57) ABSTRACT

A roller for in-furnace conveyance (1) which is provided with a fitting section (30) in which a fitting hole (11) of a body section (10) and a fitting shaft (24) of a shaft section (20) are fitted, and which constitutes a single roller by welding of the fitting section, wherein the fitting section has a first fitting section (31) in which fitting occurs with a prescribed interstice at a position separated from the weld position, and a second fitting section (32) in which fitting occurs with an interstice larger than that of the first fitting section at a position adjacent to the weld position.

7 Claims, 7 Drawing Sheets

(56) References Cited

U.S. PATENT DOCUMENTS

| | | | |
|---|---|---|---|
| 2,429,293 A * | 10/1947 | Peck et al. | 29/895.22 |
| 2,603,578 A | 7/1952 | Ornitz | 148/16 |
| 3,070,362 A | 12/1962 | Young et al. | 263/6 |
| 3,751,195 A * | 8/1973 | Snow | 432/8 |
| 4,925,014 A * | 5/1990 | Haite | 198/780 |
| 5,111,930 A * | 5/1992 | Ginzburg et al. | 198/780 |
| 5,833,455 A | 11/1998 | Carr | |
| 6,238,209 B1 * | 5/2001 | Iida | 432/59 |
| 6,438,841 B1 * | 8/2002 | Fuma et al. | 29/895.32 |
| 7,448,484 B2 * | 11/2008 | Brinkmeier et al. | 193/37 |
| 2007/0051581 A1 * | 3/2007 | Scolly | 193/37 |

FOREIGN PATENT DOCUMENTS

| | | |
|---|---|---|
| JP | A-05-222442 | 8/1993 |
| JP | 9-112787 | 5/1997 |
| JP | 2002-172452 | 6/2002 |
| JP | B-3690637 | 8/2005 |
| WO | WO 97/43591 A1 | 11/1997 |

OTHER PUBLICATIONS

International Search Report dated May 17, 2011 issued in corresponding international application No. PCT/JP2011/053519.

* cited by examiner

ROLLER FOR IN-FURNACE CONVEYANCE

CROSS REFERENCE TO RELATED APPLICATIONS

The present application is a 35 U.S.C. §371 National Phase conversion of PCT/JP2011/053519, filed Feb. 18, 2011, which claims benefit of Japanese Application No. 2010-042432, filed Feb. 26, 2010, the disclosure of which is incorporated herein by reference. The PCT International Application was published in the Japanese language.

TECHNICAL FIELD

The present invention relates to a roller for in-furnace conveyance. Priority is claimed on Japanese Patent Application No. 2010-042432, filed Feb. 26, 2010, the content of which is incorporated herein by reference.

BACKGROUND ART

Patent Document 1 discloses a roller for in-furnace conveyance which is provided in a heating furnace that serves to conduct long-term heating at high temperature of metallic work pieces for purposes of heat treatment or hot rolling. With respect to this roller for in-furnace conveyance, the overall roller is configured by reciprocal fitting and welding of roller materials, wherein a central body section and other sections are separately fabricated. According to this configuration, the manufacturing cost of the roller for in-furnace conveyance is reduced by welding together a body section and a shaft section, where the body section which is exposed to high temperature by being disposed in a central region of the furnace is fabricated from costly material with a small linear expansion coefficient, and the shaft section which is disposed in region of lower temperature than the furnace center by being positioned at furnace wall area is fabricated from inexpensive material with a larger linear expansion coefficient than the body section.

Citation List Patent Document

Patent Document 1: U.S. Pat. No. 5,833,455

However, as the fitting section of the aforementioned roller for in-furnace conveyance is made for one-step straight fitting, when different types of deformation arise in the reciprocal members due to the occurrence of load deformation and heat deformation, deformation of the weld portion is restrained by the immediately close fitting. Consequently, significant strain and stress arise in the weld portion, the weld portion is easy to break.

For example, when the shaft section and the body section are formed with materials of different composition, and the shaft section and the body section are fitted and welded together at normal temperature, and when the heating furnace enters a high-temperature condition, the shaft section which has a large linear expansion coefficient undergoes a larger thermal expansion than the body section which has a small linear expansion coefficient. Then, significant circumferential tensile strain and stress arise in the body section. As a result, deformation of the weld portion is restrained by the immediately close fitting, significant strain and stress arise in the weld portion, the weld portion is easy to break.

SUMMARY OF THE INVENTION

The present invention was made in light of the foregoing problem, and its objective is to offer a roller for in-furnace conveyance which alleviates the strain and stress that arise in weld portion when load deformation and heat deformation occur.

In order to solve the foregoing problem, the present invention is provided with a fitting section in which a fitting hole of a first constituent member and a fitting shaft of a second constituent member are fitted. The present invention is a roller for in-furnace conveyance wherein a single roller is constituted by welding of the fitting section. The fitting section has a first fitting section in which fitting occurs with a prescribed interstice at a position separated from the weld position, and a second fitting section in which fitting occurs with an interstice larger than that of the first fitting section at a position adjacent to the weld position.

By means of this configuration, in the present invention, a large clearance is formed by the second fitting section in the immediate vicinity of the weld position. Consequently, in the present invention, even if different types of deformation occur in the reciprocal members due to load deformation and heat deformation, restriction at the weld is reduced, reducing strain and stress at the weld position. Moreover, in the present invention, clearance at the position separated from the weld position is small due to the first fitting section. Consequently, the fitting accuracy of the first constituent member and the second constituent member is ensured, enabling easy welding.

In the present invention, it is desirable that the first constituent member and the second constituent member are composed of different materials of mutually different compositions.

By adopting this configuration, in the present invention, strain and stress at the weld position are alleviated even when the first constituent member and the second constituent member are made of different materials of different compositions.

In the present invention, it is desirable that the first constituent member and the second constituent member are composed of different materials with mutually different linear expansion coefficients.

By means of this configuration, in the present invention, strain and stress are alleviated at the weld position when heat deformation occurs even when the first constituent member and the second constituent member are made of different materials with different linear expansion coefficients.

In the present invention, it is desirable that the fitting shaft is a two-step structure which has a large-diameter shaft section having a diameter corresponding to the first fitting section, and a small-diameter shaft section having a diameter smaller than the large-diameter shaft section corresponding to the second fitting section.

By means of this configuration, in the present invention, a two-step fitting of the fitting shaft in which fitting clearance at the position adjacent to the weld position is large, and fitting clearance at the position separated from the weld position is small is obtained.

In the present invention, it is desirable that a heat insulating member which covers the end portion of the fitting shaft is provided.

By means of this configuration, in the present invention, it is possible to prevent the outflow of heat from the end portion of the fitting shaft. By providing a heat insulating member, the temperature difference between the first constituent member and the second constituent member is increased, thereby increasing the difference in heat deformation. However, as there is a large clearance in the immediate vicinity of the weld position due to the second fitting section, restriction at the weld position is reduced, alleviating strain and stress at the weld position.

In the present invention, it is desirable that fitting in the fitting section is a loose fit.

By means of this configuration, in the present invention, restriction at the weld position is reduced, alleviating strain and stress at the weld position.

According to the present invention, a roller for in-furnace conveyance is obtained which alleviates strain and stress generating at a weld position when load deformation and heat deformation occur.

DESCRIPTION OF PREFERRED EMBODIMENTS

Rollers for in-furnace conveyance of embodiments of the present invention are described below with reference to drawings.

(First Embodiment)

Figure 1:
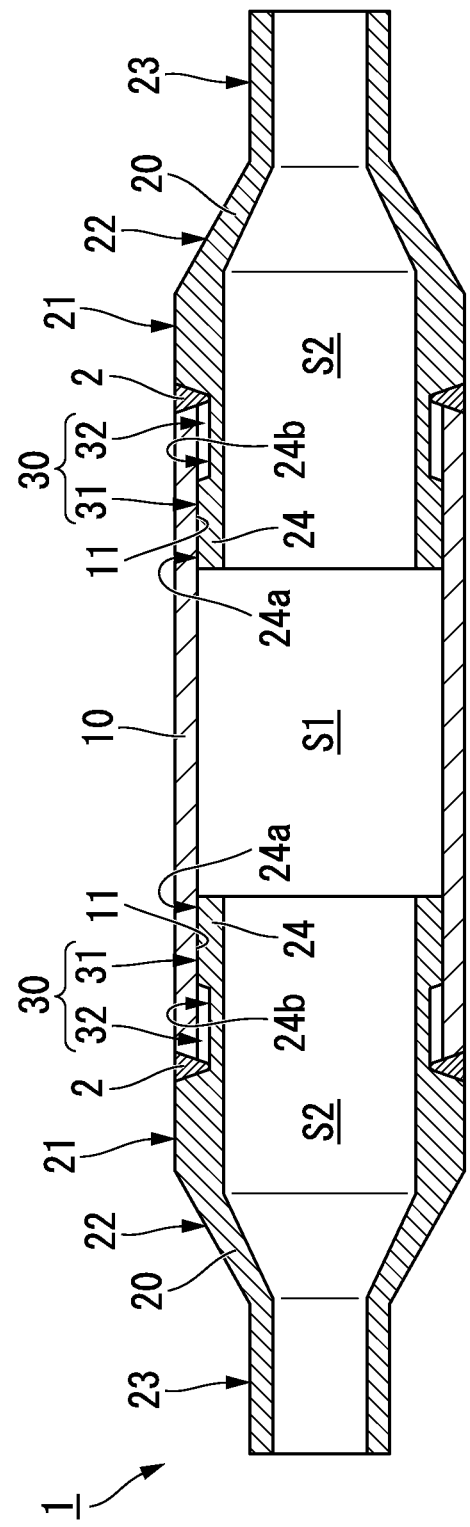
FIG. 1 is a cross-sectional view which shows a roller for in-furnace conveyance of a first embodiment of the present invention.
Figure 2:
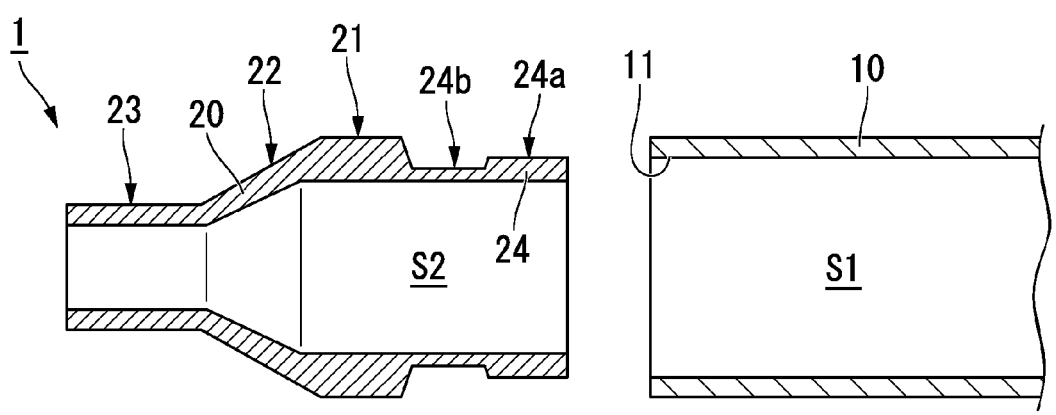
FIG. 2 is an exploded view which shows constituent members of the roller for in-furnace conveyance of the first embodiment of the present invention.

FIG. 1 is a cross-sectional view which shows a roller for in-furnace conveyance 1 of a first embodiment of the present invention. FIG. 2 is an exploded view which shows constituent members of the roller for in-furnace conveyance 1 of the first embodiment of the present invention.

The roller for in-furnace conveyance 1 is composed of two or more constituent members, and constitutes a single roller by welding. The roller for in-furnace conveyance 1 is provided in a heating furnace which serves to conduct long-term heating at high temperature of metallic work pieces for purposes of heat treatment or hot rolling. The roller for in-furnace conveyance 1 has a body section (first constituent member) 10 which conveys a metallic work piece at the furnace center, and shaft sections (second constituent members) 20 which are welded to the both end portions of the body section 10.

The body section 10 is composed of material with a smaller linear expansion coefficient than the shaft sections 20, because it is disposed in the central region of the furnace where it is exposed to high temperature. The body section 10 is molded into a cylindrical shape, and a hollow section S1 is formed in its interior. Fitting holes 11 which fit the shaft sections 20 are provided at the both end portions of the body section 10.

The shaft sections 20 are disposed in regions of lower temperature than the center of the furnace by being positioned at furnace wall (not illustrated in the drawings). Consequently, the shaft sections 20 are composed of material with a larger linear expansion coefficient than the body section 10. Each shaft section 20 has a hollow section S2 formed in its interior, and includes a large-diameter section 21 of the same diameter as the external form of the body section 10, a small-diameter section 23 with a smaller diameter than the large-diameter section 21, and a tapered section 22 provided between the large-diameter section 21 and the small-diameter section 23. At the end portion of the large-diameter section 21, a fitting shaft 24 is provided which fits the fitting hole 11 of the body section 10.

As shown in FIG. 1, fitting section 30, where the fitting hole 11 of the body section 10 and the fitting shaft 24 of the shaft section 20 are fitted, is connected by a weld portion 2. The weld portion 2 is a site where a bead is formed by arc welding such as TIG welding or MIG welding across the entire circumference along a groove form that is formed between the end portion of the body section 10 and the large-diameter section 21 of the shaft section 20. Moreover, the weld portion 2 is formed using a welding rod made of an intermediate material (a material that is intermediate in terms of composition and linear expansion coefficient) relative to the material constituting the body section 10 and the material constituting the shaft section 20.

The fitting section 30 has a first fitting section 31 in which fitting occurs with a prescribed interstice at a position separated from the position where the weld portion 2 is formed (welding position), and a second fitting section 32 in which fitting occurs with an interstice larger than that of the first fitting section 31 at a position adjacent to the welding position. The first fitting section 31 and second fitting section 32 fit with a loose fit. More specifically, the fitting hole 11 and the fitting shaft 24 have a fitting diameter on the order of Φ135 (mm). Moreover, the small clearance formed by the first fitting section 31 is of the H7h7 tolerance zone class set forth in Japanese Industrial Standard CI IS), while the large clearance formed by the second fitting section 32 is of the H7e7 tolerance zone class.

The fitting shaft 24 has a two-step structure which has a large-diameter shaft section 24a provided with a diameter corresponding to the first fitting section 31, and a small-diameter shaft section 24b provided with a diameter, which is smaller than the large-diameter shaft section 24a, corresponding to the second fitting section 32. By means of this configuration, in the present embodiment, a two-step fitting is obtained whereby fitting clearance at the position adjacent to the weld portion 2 is large, and fitting clearance at the position separated from the weld portion 2 is small.

Figure 7:
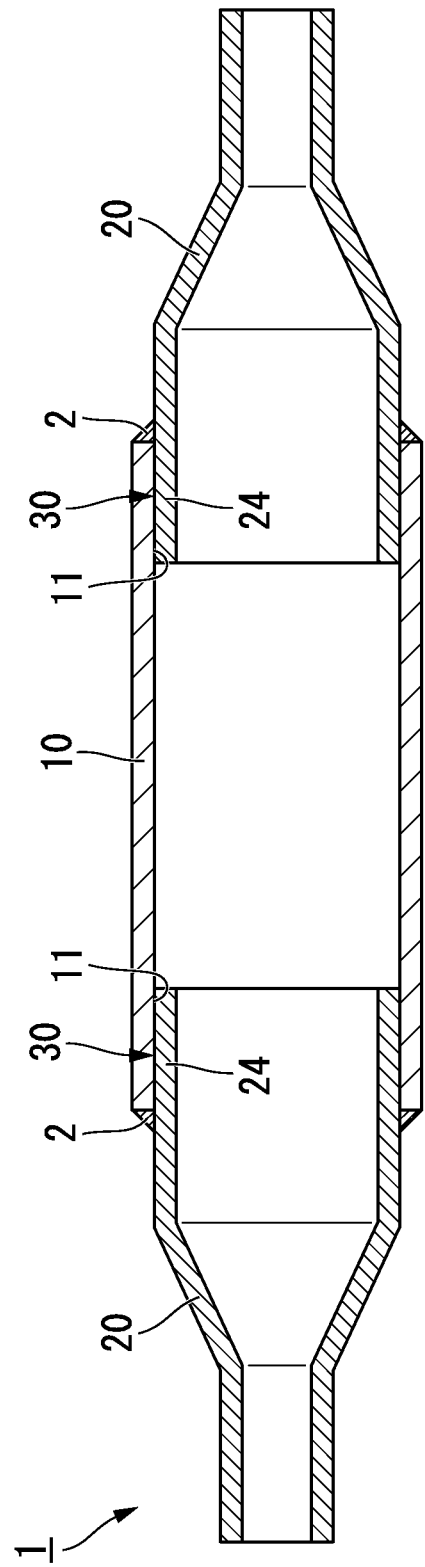
FIG. 7 is a cross-sectional view which shows the configuration of a conventional roller for in-furnace conveyance.
Figure 8:
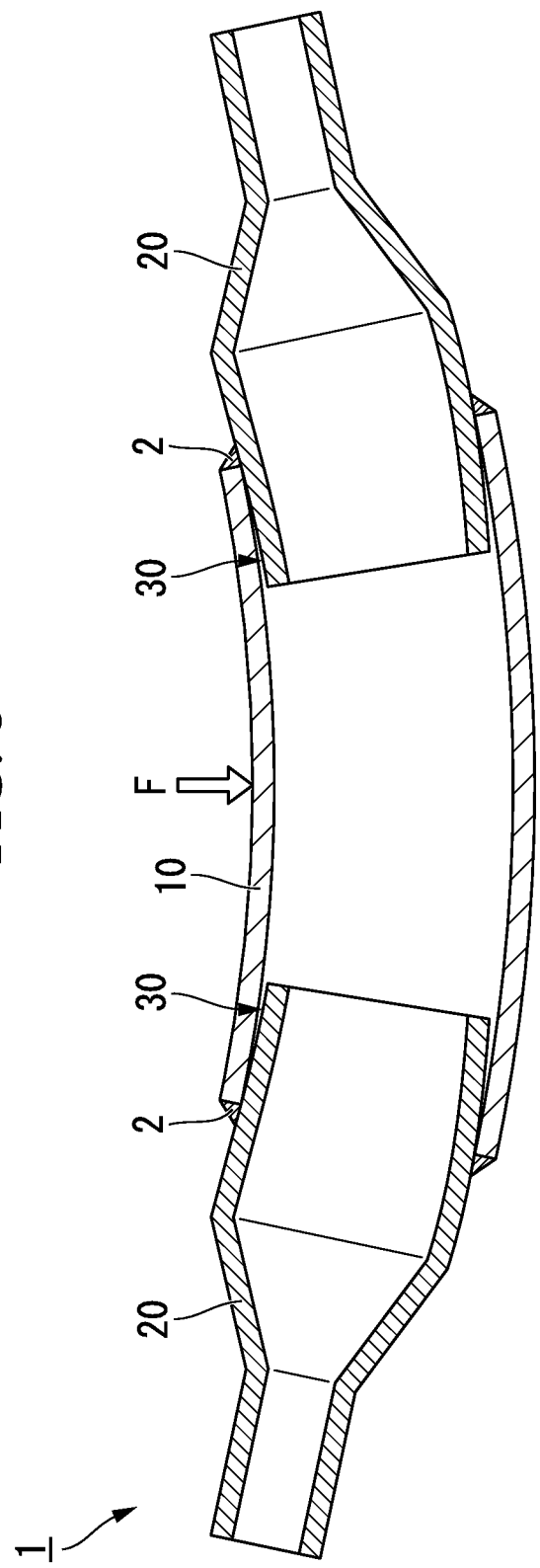
FIG. 8 shows the circumstances of deformation when a load F is imposed on a conventional roller for in-furnace conveyance.

Next, operations of the roller for in-furnace conveyance 1 of the aforementioned configuration are described with reference to FIG. 3. Differences between the roller for in-furnace conveyance of the present embodiment and a conventional roller for in-furnace conveyance are described with reference to FIG. 7 and FIG. 8. In FIG. 7 and FIG. 8, the same reference numerals are assigned to components whose configuration is identical or equivalent to the roller for in-furnace conveyance 1 of the present embodiment.

Figure 3:
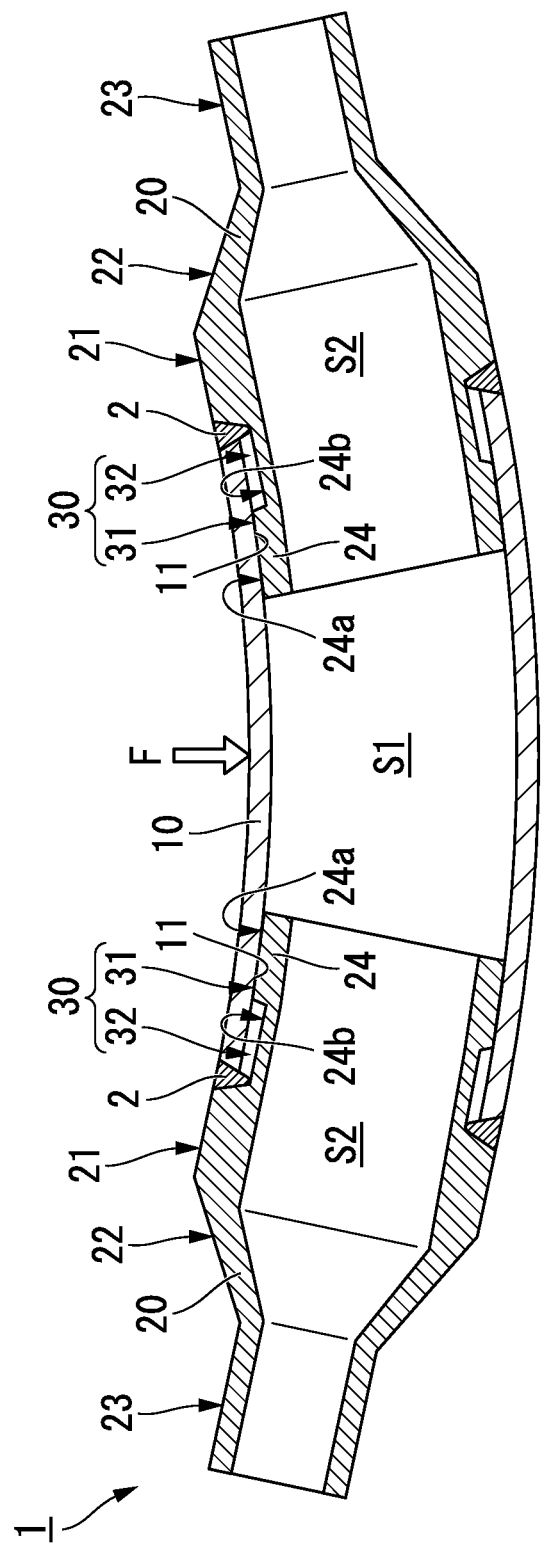
FIG. 3 shows the circumstances of deformation when a load is imposed on the roller for in-furnace conveyance of the first embodiment of the present invention.

FIG. 3 shows the circumstances of deformation when a load F is applied to the roller for in-furnace conveyance 1 of the first embodiment of the present invention. FIG. 7 is a cross-sectional view which shows the configuration of a conventional roller for in-furnace conveyance 1. FIG. 8 shows the circumstances of deformation when a load F is applied to a conventional roller for in-furnace conveyance 1.

As the fitting section 30 of a conventional roller for in-furnace conveyance 1 is one-step straight fitting as shown in FIG. 7, when the roller for in-furnace conveyance 1 undergoes load deformation due to a load F, deformation of the weld 2 is restrained by the fitting in the immediate vicinity of the weld portion 2 as shown in FIG. 8. Consequently, significant strain and stress arise at the weld portion 2, the weld portion 2 is easy to breakage.

On the other hand, with the roller for in-furnace conveyance 1 of the present embodiment, a clearance in the immediate vicinity of the weld portion 2 is large due to the second fitting section 32. Consequently, as shown in FIG. 3, when the roller for in-furnace conveyance 1 undergoes load deformation due to a load F, restriction at the weld portion 2 is reduced, alleviating strain and stress at the weld portion 2. Moreover, as fitting in the fitting section 30 is of the loose fit type, restriction at the weld portion 2 is further reduced, alleviating strain and stress at the weld portion 2.

In the fitting section 30 of the roller for in-furnace conveyance 1 shown in FIG. 7, the body section 10 and the shaft section 20 are formed from different materials of differing composition. Consequently, when the body section 10 and the shaft section 20 are fitted and welded at room temperature, and when the heating furnace enters a high-temperature condition, the shaft section 20 with the large linear expansion coefficient undergoes a larger thermal expansion than the body section 10 with the small linear expansion coefficient. Significant tensile strain and stress then arise in the circumferential direction of the body section 10. On the other hand, deformation of the weld portion 2 is restrained by the fitting in the immediate vicinity of the weld portion 2. As a result, significant strain and stress arise in the weld portion 2, the weld 2 is easy to breakage.

By contrast, by means of the fitting section 30 of the roller for in-furnace conveyance 1 of the present embodiment shown in FIG. 1, even if different types of deformation arise in the reciprocal members due to heat deformation, restriction at the weld portion 2 is reduced as a result of the large clearance in the immediate vicinity of the weld portion 2 due to the second fitting section 32, alleviating strain and stress at the weld portion 2. Moreover, as clearance at the position separated from the weld portion 2 is small due to the first fitting section 31, the fitting accuracy of the body section 10 and the shaft section 20 is ensured. Furthermore, even if a difference in thermal expansion arises at the position separated from the weld portion 2, propagation of strain and stress to the weld portion 2 is reduced.

As stated above, according to the first embodiment of the present invention, the roller for in-furnace conveyance 1 is provided with a fitting section 30 where the fitting hole 11 of the body section 10 and the fitting shaft 24 of the shaft section 20 are fitted, and a single roller is formed by welding of the fitting section 30. The fitting section 30 has a first fitting section 31 where fitting occurs with a prescribed interstice at a position separated from the welding position, and a second fitting section 32 where fitting occurs with an interstice larger than that of the first fitting section 31 at a position adjacent to the welding position. Consequently, even if different types of deformation arise in the reciprocal members due to load deformation and heat deformation, restriction at the weld portion 2 is reduced due to the large clearance in the immediate vicinity of the weld portion 2 resulting from the second fitting section 32. Consequently, strain and stress in the weld portion 2 are alleviated. Moreover, as clearance at the position separated from the weld portion 2 is small due to the first fitting section 31, the fitting accuracy of the body section 10 and the shaft section 20 is ensured, enabling easy welding.

Accordingly, in the first embodiment described above, the strain and stress arisen in the weld portion 2 are alleviated when load deformation and heat deformation occur in the roller for in-furnace conveyance 1.

(Second Embodiment)

Next, a second embodiment of the present invention is described. In the following description, the same reference numerals are assigned to components which are identical or equivalent to those of the foregoing embodiment, and description thereof is simplified or omitted.

Figure 4:
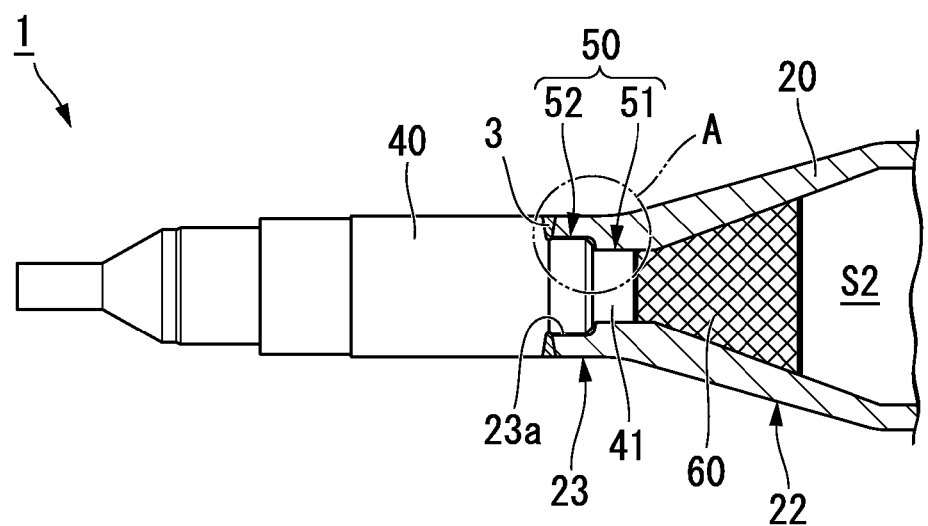
FIG. 4 is a cross-sectional view which shows the assemblage site of a shaft section and a shaft spindle of the roller for in-furnace conveyance of a second embodiment of the present invention.
Figure 5:
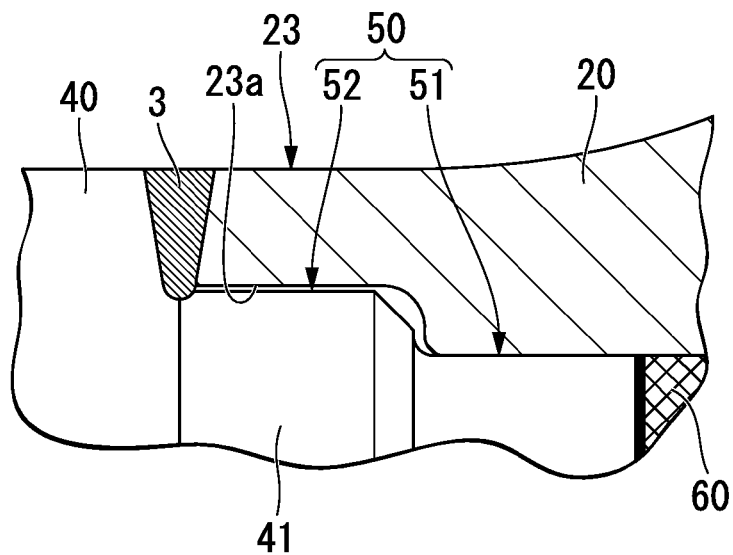
FIG. 5 is an enlarged view of region A shown in FIG. 4.

FIG. 4 is a cross-sectional view which shows the assemblage site of the shaft section 20 and a shaft spindle 40 of the roller for in-furnace conveyance 1 in the second embodiment of the present invention. FIG. 5 is an enlarged view of region A shown in FIG. 4.

The roller for in-furnace conveyance 1 has a shaft spindle (second constituent member) 40 welded to the shaft section (first constituent member) 20. At the end portion of the small-diameter section 23 of the shaft section 20 is provided a fitting hole 23a of two-step structure into which the shaft spindle 40 fits.

The shaft spindle 40 is axially supported by a bearing (not illustrated in the drawings) on the outer side of the furnace wall, and is disposed in a region of lower temperature than the furnace wall. Consequently, the shaft spindle 40 is composed of material with a larger linear expansion coefficient than the shaft section 20.

The shaft spindle 40 is provided with a fitting shaft 41 which fits the fitting hole 23a. The fitting shaft 41 is configured with a two-step structure corresponding to the fitting hole 23a of two-step structure.

A fitting section 50, where the fitting hole 23a of the shaft section 20 and the fitting shaft 41 of the shaft spindle 40 fit, is connected by a weld portion 3.

As shown in FIG. 5, the fitting section 50 has a first fitting section 51 where fitting occurs with a prescribed interstice at a position separated from the position where the weld portion 3 is formed (the welding position), and a second fitting section 52 where fitting occurs with an interstice larger than that of the first fitting section 51 at a position adjacent to the welding position. The first fitting section 51 and the second fitting section 52 together constitute a loose fit.

Therefore, according to the roller for in-furnace conveyance 1 of the aforementioned configuration, restriction at the weld portion 3 is reduced as a result of the large clearance in the immediate vicinity of the weld portion 3 due to the second fitting section 52. Consequently, strain and stress are alleviated at the weld portion 3.

In order to prevent the outflow of heat from the shaft spindle 40, the roller for in-furnace conveyance 1 is provided with a heat insulating member 60 so as to cover the distal portion of the fitting shaft 41. The heat insulating member 60 is provided so as to fill the hollow section S2 of the region corresponding to the tapered section 22.

By providing the heat insulating member 60, the outflow of heat from the shaft spindle 40 can be prevented. On the other hand, the temperature difference between the shaft section 20 and the shaft spindle 40 increases, with the result that the difference in heat deformation between the shaft section 20 and the shaft spindle 40 increases. However, restriction at the weld portion 3 is reduced, because of the large clearance in the immediate vicinity of the weld portion 3 due to the second fitting section 52. Consequently, strain and stress at the weld portion 3 are alleviated.

Consequently, according to the roller for in-furnace conveyance 1 of the second embodiment, heat outflow is prevented, and strain and stress at the weld 3 are alleviated.

(Third Embodiment)

Next, a third embodiment of the present invention is described. In the following description, the same reference numerals are assigned to components which are identical or equivalent to those of the foregoing embodiments, and description thereof is simplified or omitted.

Figure 6:
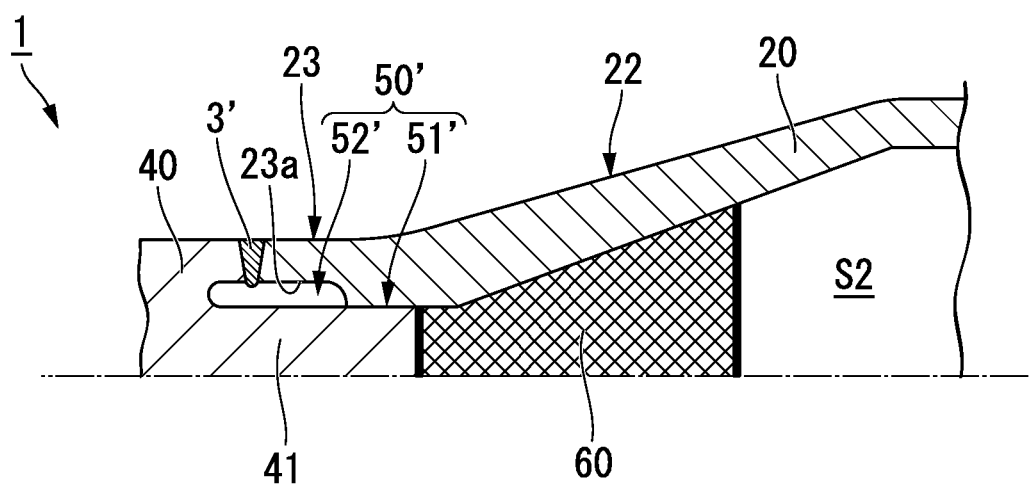
FIG. 6 is an enlarged cross-sectional view which shows the assemblage site of a shaft section and a shaft spindle of the roller for in-furnace conveyance of a third embodiment of the present invention.

FIG. 6 is an enlarged cross-sectional view which shows the assemblage site of the shaft section 20 and the shaft spindle 40 of the roller for in-furnace conveyance 1 of the third embodiment of the present invention.

As shown in FIG. 6, a fitting section 50', where the fitting hole 23a of the shaft section 20 and the fitting shaft 41 of the shaft spindle 40 fit, is connected by a weld portion 3'. The fitting section 50' has a first fitting section 51' where fitting occurs with a prescribed interstice at a position separated from the position where the weld portion 3' is formed (the welding position), and a second fitting section 52' where fitting occurs with an interstice larger than that of the first fitting section 51' at a position adjacent to the welding position. The first fitting section 51' and the second fitting section 52' together constitute a loose fit.

The second fitting section 52' of the third embodiment is provided to be adjacent to the distal surface of the weld portion 3' (the distal surface on the inner side in the radial direction). In the aforementioned embodiments, the second fitting section is formed to be adjacent to the side portion of the weld portion. Consequently, there is a possibility that stress concentration may occur at the side portion of the weld portion. However, as the second fitting section 52' is provided to be adjacent to the distal surface of the weld portion 3', concentration of stress at the weld portion can be avoided.

Preferred embodiments of the present invention have been described above with reference to drawings, but the present invention is not limited by the aforementioned embodiments. The various forms, combinations and the like of the respective constituent members shown in the aforementioned embodiments are exemplary, and may be subjected to various modifications based on design requirements and the like within a scope that does not deviate from the spirit of the present invention.

INDUSTRIAL APPLICABILITY

According to the present invention, a roller for in-furnace conveyance is obtained which alleviates strain and stress arisen in a weld when load deformation and heat deformation occur.

Description of the Reference Numerals

1: roller for in-furnace conveyance
2: weld portion
3: weld portion
3': weld portion
10: body section (first constituent member)
11: fitting hole
20: shaft section (second constituent member (first constituent member))
22a: fitting hole
24: fitting shaft
24a: large-diameter shaft section
24b: small-diameter shaft section
30: fitting section
31: first fitting section
32: second fitting section
40: shaft spindle (second constituent member)
41: fitting shaft
50: fitting section
51: first fitting section
52: second fitting section
50': fitting section
51': first fitting section
52': second fitting section
60: heat insulating member

The invention claimed is:

1. A roller for in-furnace conveyance, which comprises a fitting section in which a fitting hole of a first constituent member and a fitting shaft of a second constituent member are fitted, and which constitutes a single roller by welding of the fitting section, wherein
   the fitting section has a first fitting section in which fitting occurs with a prescribed interstice at a position separated from the weld position, and a second fitting section in which fitting occurs with an interstice larger than that of the first fitting section at a position adjacent to the weld position.

2. The roller for in-furnace conveyance according to claim 1, wherein the first constituent member and the second constituent member are different materials of mutually different compositions.

3. The roller for in-furnace conveyance according to claim 1, wherein the first constituent member and the second constituent member are composed of separate materials with mutually different linear expansion coefficients.

4. The roller for in-furnace conveyance according to claim 1, wherein the fitting shaft is a two-step structure which has a large-diameter shaft section having a diameter corresponding to the first fitting section, and a small-diameter shaft section having a diameter smaller than the large-diameter section corresponding to the second fitting section.

5. The roller for in-furnace conveyance according to claim 1, further comprising a heat insulating member which covers the end portion of the fitting shaft.

6. The roller for in-furnace conveyance according to claim 1, wherein fitting in the fitting section is a loose fit.

7. The roller for in-furnace conveyance according to claim 2, where the first constituent member and the second constituent member are composed of separate materials with mutually different linear expansion coefficients.

* * * * *